US012380796B2

(12) United States Patent
Shao et al.

(10) Patent No.: US 12,380,796 B2
(45) Date of Patent: Aug. 5, 2025

(54) METHODS FOR DETECTING GAS ALARMS BASED ON SMART GAS AND INTERNET OF THINGS (IOT) SYSTEMS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN); Yuefei Wu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 65 days.

(21) Appl. No.: 18/434,781

(22) Filed: Feb. 6, 2024

(65) Prior Publication Data

US 2024/0177594 A1 May 30, 2024

(30) Foreign Application Priority Data

Jan. 17, 2024 (CN) ......................... 202410069458.6

(51) Int. Cl.
*G08B 29/20* (2006.01)
*G08B 21/16* (2006.01)
*G08B 29/14* (2006.01)

(52) U.S. Cl.
CPC ............. *G08B 29/20* (2013.01); *G08B 21/16* (2013.01); *G08B 29/14* (2013.01)

(58) Field of Classification Search
CPC ........ G08B 29/20; G08B 21/16; G08B 21/12; G08B 29/14; G08B 29/12
See application file for complete search history.

(56) References Cited

FOREIGN PATENT DOCUMENTS

| | | | | | |
|---|---|---|---|---|---|
| CN | 116758708 A | * | 9/2023 | ............... | F17D 1/02 |
| CN | 117351662 A | * | 1/2024 | ............. | G08B 21/16 |
| CN | 118230527 A | * | 6/2024 | ............. | G08B 21/16 |
| CN | 118280084 A | * | 7/2024 | ............. | G01F 15/06 |
| CN | 119132003 A | * | 12/2024 | ........... | G08B 21/182 |
| KR | 102281640 B1 | * | 7/2021 | ............. | G08B 29/20 |

* cited by examiner

*Primary Examiner* — Andrew W Bee
(74) *Attorney, Agent, or Firm* — Metis IP LLC

(57) ABSTRACT

Embodiments of the present disclosure provide a method for detecting a gas alarm based on smart gas and an Internet of Things (IoT) system. The method comprises: determining a self-detection parameter and collecting gas monitoring data through the gas alarm; in response to determining that a collaborative verification request is received or a collaborative cycle is satisfied, determining whether the gas alarm has a fault based on the gas monitoring data and gas usage data of a user; in response to determining that the gas alarm has the fault, generating, based on the gas monitoring data, a fault data sequence of the gas alarm; and determining, based on the fault data sequence, a dispatching maintenance parameter of the gas alarm. The IoT system comprises a smart gas user platform, a smart gas service platform, a smart gas safety management platform, a smart gas indoor equipment sensor network platform, and a smart gas indoor equipment object platform. The smart gas safety management platform is configured to perform the method for detecting the gas alarm based on smart gas.

19 Claims, 4 Drawing Sheets

200

METHODS FOR DETECTING GAS ALARMS BASED ON SMART GAS AND INTERNET OF THINGS (IOT) SYSTEMS

CROSS-REFERENCES TO RELATED APPLICATIONS

This application claims priority of Chinese Patent Application No. 202410069458.6, filed on Jan. 17, 2024, the content of which is entirely incorporated herein by reference.

TECHNICAL FIELD

The present disclosure relates to the field of gas equipment detection, and in particular to a method for detecting a gas alarm based on smart gas and an Internet of Things (IoT) system.

BACKGROUND

With an increasing popularity of gas, safety hazards associated with gas-related problems (e.g., gas leakage) have been paid more and more attention, and a gas alarm is gradually becoming common equipment for monitoring the safety of gas usage. The gas alarm needs to detect low concentrations of combustible gases in surrounding environment. When a gas leakage occurs and the concentration of flammable gas is higher than a critical point, the gas alarm sends out an alarm signal. Therefore, whether the gas alarm works normally is very important for the safety of gas usage. At present, whether the gas alarm works normally is generally determined by a factory test, a regular manual test, etc. However, when a failure occurs in the process of use of the gas alarm, a gas company or a gas user may not detect the failure in time, resulting in the safety risk in the gas usage of the gas user.

Therefore, it is desirable to provide a method for detecting a gas alarm based on smart gas and an Internet of Things (IoT) system, which may detect whether the gas alarm is faulty in time and carry out maintenance, thereby improving the performance and reliability of the gas alarm, adequately satisfying user needs in time and guaranteeing the user safety.

SUMMARY

One or more embodiments of the present disclosure provide a method for detecting a gas alarm based on smart gas. The method for detecting the gas alarm based on smart gas may comprise: determining a self-detection parameter and collecting gas monitoring data through the gas alarm, the self-detection parameter including a self-detection cycle and a transmission cycle, and the gas monitoring data including at least one of gas concentration data, ambient temperature data, and ambient humidity data; in response to determining that a collaborative verification request is received or a collaborative cycle is satisfied, determining whether the gas alarm has a fault based on the gas monitoring data and gas usage data of a user; in response to determining that the gas alarm has the fault, generating, based on the gas monitoring data, a fault data sequence of the gas alarm; and determining, based on the fault data sequence, a dispatching maintenance parameter of the gas alarm.

One or more embodiments of the present disclosure provide an Internet of things (IoT) system for detecting a gas alarm based on smart gas. The IoT system may comprise a smart gas user platform, a smart gas service platform, a smart gas safety management platform, a smart gas indoor equipment sensor network platform, and a smart gas indoor equipment object platform which interact in sequence. The smart gas safety management platform may include a smart gas indoor safety management sub-platform and a smart gas data center. The smart gas indoor equipment sensor network platform may be configured to interact with the smart gas data center and the smart gas indoor equipment object platform. The smart gas safety management platform may be configured to: determine a self-detection parameter and collect gas monitoring data through the gas alarm, the self-detection parameter including a self-detection cycle and a transmission cycle, and the gas monitoring data including at least one of gas concentration data, ambient temperature data, and ambient humidity data; in response to determining that a collaborative verification request is received or a collaborative cycle is satisfied, determine whether the gas alarm has a fault based on the gas monitoring data and gas usage data of a user; in response to determining that the gas alarm has the fault, generate, based on the gas monitoring data, a fault data sequence of the gas alarm; and determine, based on the fault data sequence, a dispatching maintenance parameter of the gas alarm. The smart gas service platform may be configured to send the dispatching maintenance parameter to the smart gas user platform.

One or more embodiments of the present disclosure provide a non-transitory computer-readable storage medium storing computer instructions that, when read by a computer, may direct the computer to implement the method for detecting the gas alarm based on smart gas.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
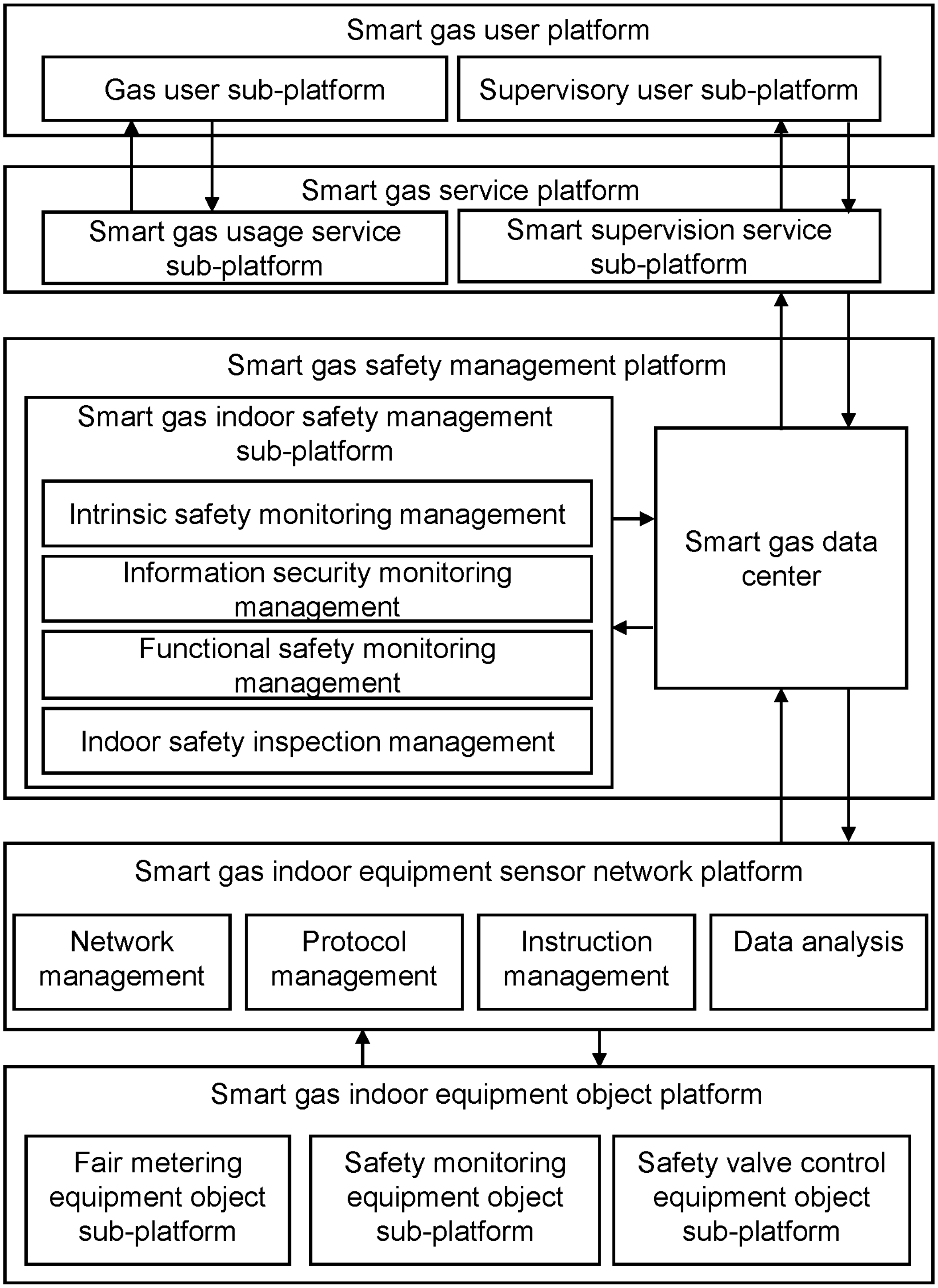
FIG. 1 is a structural diagram illustrating an exemplary platform of an Internet of Things (IoT) system for detecting a gas alarm based on smart gas according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

FIG. 1 is a structural diagram illustrating an exemplary platform of an Internet of Things (IoT) system for detecting a gas alarm based on smart gas according to some embodiments of the present disclosure. It should be noted that the following embodiments are used only for the purpose of interpreting the present disclosure and do not constitute a limitation of the present disclosure.

As illustrated in FIG. 1, the IoT system for detecting the gas alarm based on smart gas may comprise a smart gas user platform, a smart gas service platform, a smart gas safety management platform, a smart gas indoor equipment sensor network platform, and a smart gas indoor equipment object platform which interact in sequence.

The smart gas user platform refers to a platform configured to interact with users. In some embodiments, the smart gas user platform may be configured as terminal equipment. In some embodiments, the smart gas user platform may include a gas user sub-platform and a supervisory user sub-platform. The gas user sub-platform refers to a platform that provides gas users with data related to gas usage and solutions to gas problems. The gas users may include an industrial gas user, a commercial gas user, an ordinary gas user, etc. The supervisory user sub-platform refers to a platform for supervisory users to supervise operation of the entire IoT system. The supervisory users may include a staff from a safety management department, etc.

The smart gas service platform refers to a platform configured to communicate user needs and control information. The smart gas service platform may obtain information, or the like, from a smart gas safety management platform (e.g., the smart gas data center) and send the information, or the like, to the smart gas user platform. In some embodiments, the smart gas service platform may be configured to send a dispatching maintenance parameter of the gas alarm to the smart gas user platform. In some embodiments, the smart gas service platform may include a smart gas usage service sub-platform and a smart supervision service sub-platform. The smart gas usage service sub-platform refers to a platform that provides gas services to the gas users. The smart supervision service sub-platform refers to a platform that provides supervision needs to the supervisory users.

The smart gas safety management platform refers to a platform that coordinates and harmonizes connection and collaboration between various functional platforms, aggregates all the information of the IoT, and provides perception management and control management functions for the IoT operation system. In some embodiments, the smart gas safety management platform may include a smart gas indoor safety management sub-platform and a smart gas data center. The smart gas indoor safety management sub-platform refers to a platform configured to process information related to the gas alarm, or the like. In some embodiments, the intelligent gas indoor safety management sub-platform may include, but is not limited to, management modules such as an intrinsic safety monitoring management module, an information security monitoring management module, a functional safety monitoring management module, and an indoor safety inspection management module. The smart gas indoor safety management sub-platform may analyze and process the information related to the gas alarm by the management modules.

The smart gas data center may be configured to store and manage all operation information of the IoT system for detecting the gas alarm based on smart gas. In some embodiments, the smart gas data center may be configured as storage equipment for storing data related to the gas alarm, such as gas monitoring data, a collaborative verification request, or the like. In some embodiments, the smart gas safety management platform may perform information interaction with the smart gas indoor equipment sensor network platform and the smart gas indoor equipment object platform, respectively, through the smart gas data center. For example, the smart gas data center may send a self-detection parameter to the smart gas indoor equipment object platform. As another example, the smart gas data center may send an instruction for obtaining date data to the smart gas indoor equipment sensor network platform to obtain the date data.

The smart gas indoor equipment sensor network platform refers to a functional platform that manages sensor communication. In some embodiments, the smart gas indoor equipment sensor network platform may be configured to interact with the smart gas data center and the smart gas indoor equipment object platform. In some embodiments, the smart gas indoor equipment sensor network platform may implement functions of perception information sensor communication and control information sensor communication. In some embodiments, the smart gas indoor equipment sensor network platform may include modules such as a network management module, a protocol management module, an instruction management module, a data analysis module, etc.

The smart gas indoor equipment object platform refers to a functional platform for perception information generation and control information execution. For example, the smart gas indoor equipment object platform may monitor and generate operation information of gas equipment. In some embodiments, the smart gas indoor equipment sensor network platform may include a fair metering equipment object sub-platform, a safety monitoring equipment object sub-platform, and a safety valve control equipment object sub-platform. In some embodiments, the smart gas indoor equipment object platform may be configured as a gas equipment gas alarm, a flow meter, a manometer, a gas meter, gas valve control equipment, a gas emergency shut-off valve, or the like. The gas equipment may include a gas stove, a water heater, or the like. The gas alarm may include components such as a temperature sensor, a humidity sensor, a gas concentration sensor, a processor, storage equipment, etc. More descriptions may be found in the related descriptions of FIG. 2. More descriptions may be found in the related descriptions of FIGS. 2-4.

According to some embodiments of the present disclosure, the IoT system for detecting the gas alarm based on smart gas may form a closed loop of information operation between the smart gas indoor equipment object platform and the smart gas user platform, and perform coordinated and regular operation under unified management of the smart gas safety management platform, thereby realizing the informatization and intelligence of detection of the gas alarm.

Figure 2:
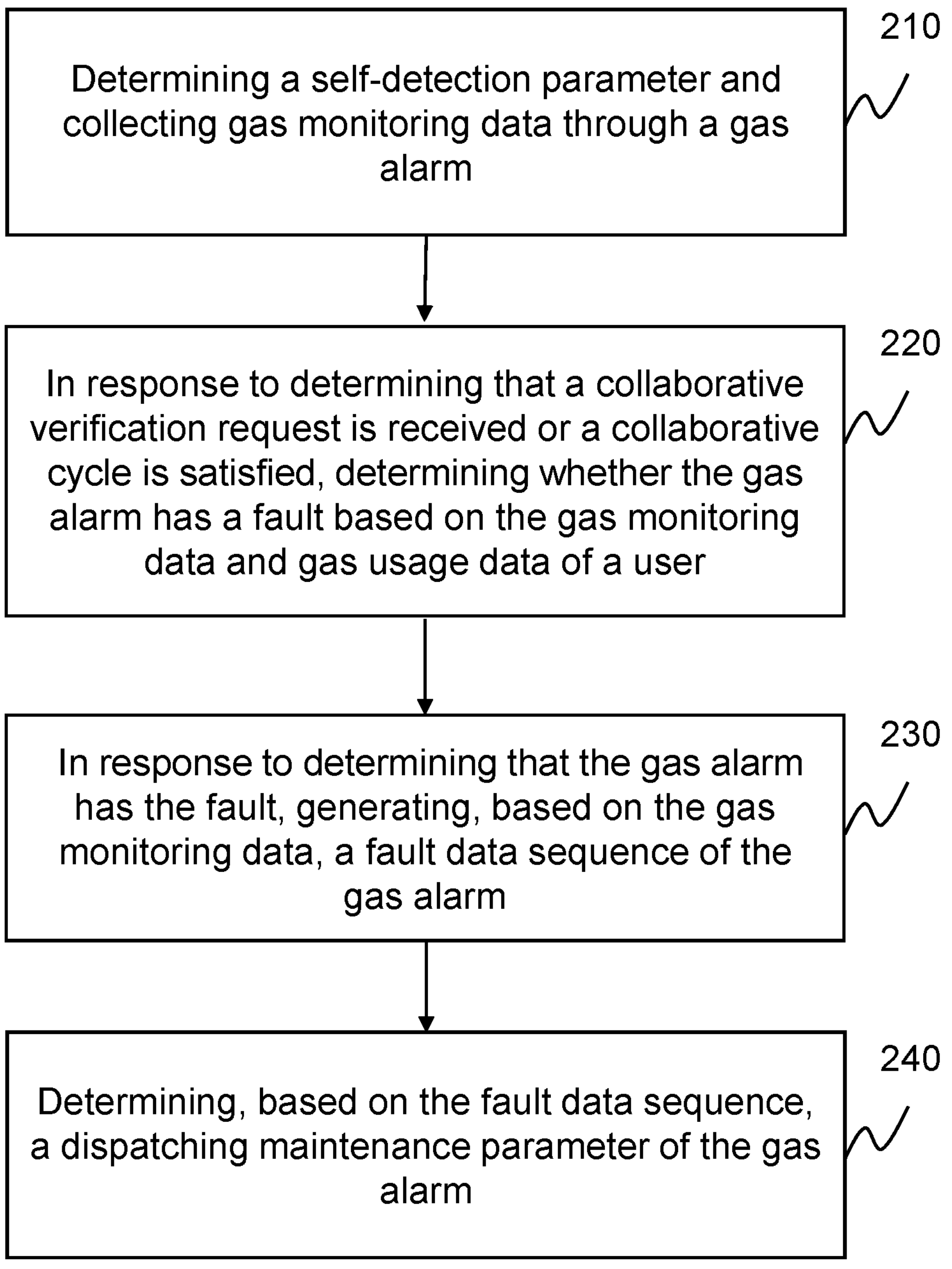
FIG. 2 is a flowchart illustrating an exemplary method for detecting a gas alarm based on smart gas according to some embodiments of the present disclosure.

FIG. 2 is a flowchart illustrating an exemplary method for detecting a gas alarm based on smart gas according to some embodiments of the present disclosure. As illustrated in FIG. 2, a process 200 may include the following operations. In some embodiments, the process 200 may be performed by a smart gas safety management platform.

Operation 210, determining a self-detection parameter and collecting gas monitoring data through a gas alarm.

A self-detection parameter refers to a parameter related to self-detection of the gas alarm. In some embodiments, the self-detection parameter may include a self-detection cycle and a transmission cycle. The self-detection cycle refers to a cycle in which the gas alarm performs the self-detection. The transmission cycle refers to a cycle in which the gas alarm transmits the gas monitoring data to the smart gas data center through the smart gas indoor equipment sensor network platform. In some embodiments, the self-detection parameter may be preset by a staff.

In some embodiments, the smart gas safety management platform may determine at least one self-detection parameter at a preset cycle and send the self-detection parameter to at least one gas alarm. The preset cycle may be set based on actual needs.

In some embodiments, the smart gas safety management platform may generate, based on a service life of the gas alarm, seasonal data of the gas alarm, and gas usage data, a detection feature vector; and determine, based on the detection feature vector, the self-detection parameter through a vector database.

A service life of the gas alarm refers to a service time of the gas alarm, such as 1 year, 2 years, etc. In some embodiments, the smart gas safety management platform may obtain the service life of the gas alarm through the smart gas indoor equipment sensor network platform.

Seasonal data of the gas alarm refers to a season to which a current time belongs. In some embodiments, the smart gas safety management platform may automatically obtain the seasonal data of the gas alarm based on the current time.

Gas usage data refers to usage data of gas equipment. For example, the gas usage data may include data such as a turn-on time, a duration of usage, a consumption, a turn-on power, etc., of the gas equipment such as a gas stove, a water heater, etc., in user's home. In some embodiments, the smart gas safety management platform may obtain the gas usage data of the networked gas equipment through the smart gas indoor equipment sensor network platform. In some embodiments, the gas usage data may be characterized by a user usage feature. For example, the user usage feature may include a gas usage frequency and a gas consumption of the user.

A detection feature vector refers to a vector capable of characterizing a relevant feature of the gas alarm. In some embodiments, the smart gas safety management platform may construct the detection feature vector based on the service life of the gas alarm, the seasonal data of the gas alarm, and the gas usage data. Different elements in the detection feature vector may characterize the service life of the gas alarm, the seasonal data of the gas alarm, and the gas usage data, respectively.

The vector database may include, for each of a plurality of gas alarms, reference feature vectors constructed based on historical service life, historical seasonal data, and historical user usage features of each of the plurality of gas alarms and reference self-detection parameters corresponding to the reference feature vectors. The reference self-detection parameters may include reference self-detection cycles and reference transmission cycles. The smart gas safety management platform may determine, based on the detection feature vector, reference feature vectors satisfying reference preset conditions in the vector database, and determine the reference self-detection parameters corresponding to the reference feature vectors satisfying the reference preset conditions as the self-detection parameter of the gas alarm. A reference preset condition refers to a determination condition for determining the reference feature vectors. In some embodiments, the reference preset conditions may include that a vector distance is less than a distance threshold, the vector distance is minimal, or the like.

In some embodiments of the present disclosure, the self-detection parameter may be determined using the vector database, so that factors affecting the performance of the gas alarm may be more comprehensively considered, thereby determining the self-detection parameter of the gas alarm more accurately, and improving the performance and reliability of the gas alarm.

In some embodiments, the detection feature vector may also be related to gas concentration fluctuation data.

The gas concentration fluctuation data refers to data capable of reflecting an extent to which a gas concentration fluctuates. In some embodiments, the gas concentration fluctuation data may be a difference, a variance, and a change per unit of time between current gas concentration data and historical gas concentration data, etc. Descriptions regarding the current gas concentration data and the historical gas concentration data may be found in the related descriptions of FIG. 2.

In some embodiments, the smart gas safety management platform may construct, based on the service life of the gas alarm, the seasonal data of the gas alarm, the user usage data, and the gas concentration fluctuation data, the detection feature vector. The vector database may include, for each of the plurality of gas alarms, reference feature vectors constructed based on the historical service life, the historical seasonal data, the historical user usage features, and the historical gas concentration fluctuation data of each of the plurality of gas alarms, and the reference self-detection parameters (e.g., the reference self-detection cycles and the reference transmission cycles) corresponding to the reference feature vectors. Descriptions regarding determining the self-detection parameter of the gas alarm based on the vector database may be found in the related descriptions of FIG. 2.

In some embodiments of the present disclosure, the larger the gas concentration fluctuation data, the larger the change magnitude or the change frequency of the gas concentration. The smart gas safety management platform may shorten the transmission cycle and the self-detection cycle, thereby better evaluating a situation of the gas alarm.

A gas alarm refers to an instrument for gas detection and alarm. In some embodiments, the gas alarm may include components such as a temperature sensor, a humidity sensor, a gas concentration sensor, a processor, storage equipment, etc. The temperature sensor may be configured to monitor ambient temperature data. The humidity sensor may be configured to monitor ambient humidity data. The gas concentration sensor may be configured to monitor gas concentration data. The processor may perform easy data processing. The storage equipment may store a small amount of data collected by the gas alarm, and empty the data periodically to store new data.

Gas monitoring data refers to monitoring data of an environment of gas usage. In some embodiments, the gas monitoring data may include at least one of the gas concentration data, the ambient temperature data, and the ambient humidity data. The gas monitoring data may include data at a plurality of time points, such as current gas monitoring data and historical gas monitoring data.

Gas concentration data refers to a gas concentration in the environment of gas usage. The gas concentration data may include the current gas concentration data and the historical gas concentration data. In some embodiments, the gas concentration sensor of the gas alarm may collect the gas concentration data. The gas alarm may transmit, based on the transmission cycle, the collected gas concentration data to the smart gas data center through the smart gas indoor equipment sensor network platform. More descriptions regarding the current concentration data and the historical gas concentration data may be found in FIG. 2 and related descriptions thereof.

Ambient temperature data refers to a temperature of the environment of gas usage. In some embodiments, the temperature sensor of the gas alarm may collect the ambient temperature data. The gas alarm may transmit, based on the transmission cycle, the collected ambient temperature data to the smart gas data center through the smart gas indoor equipment sensor network platform.

Ambient humidity data refers to a humidity of the environment of gas usage. In some embodiments, the humidity sensor of the gas alarm may collect the ambient humidity data. The gas alarm may transmit, based on the transmission cycle, the collected ambient humidity data to the smart gas data center through the smart gas indoor equipment sensor network platform.

In some embodiments, the smart gas safety management platform may collect the gas monitoring data through the gas alarm. The historical gas monitoring data may be temporarily stored in the storage equipment of the gas alarm. In some embodiments, the gas alarm may transmit, based on the transmission cycle, the gas monitoring data and the historical gas monitoring data in the storage equipment to the smart gas data center of the smart gas safety management platform through the smart gas indoor equipment sensor network platform. The smart gas safety management platform may receive the gas monitoring data transmitted by the gas alarm and further process the gas monitoring data.

Operation 220, in response to determining that a collaborative verification request is received or a collaborative cycle is satisfied, determining whether the gas alarm has a fault based on the gas monitoring data and gas usage data of a user.

A collaborative calibration request refers to request data for the smart gas safety management platform to collaboratively determine whether the gas alarm has the fault. A fault type of the gas alarm may include a component fault, a sensor fault, a circuit aging fault, etc. In some embodiments, the collaborative verification request may be sent to the smart gas safety management platform by the gas alarm through the smart gas indoor equipment sensor network platform.

In some embodiments, the smart gas safety management platform may determine a self-detection result through the gas alarm. The self-detection result may be determined based on the current gas concentration data and the historical gas concentration data. The smart gas safety management platform may issue the collaborative verification request and the gas monitoring data through the gas alarm. The collaborative verification request and the gas monitoring data may be issued in response to determining that the self-detection result satisfying a first predetermined condition.

Current gas concentration data refers to gas concentration data collected by the gas alarm in a current time period.

Historical gas concentration data refers to gas concentration data collected by the gas alarm in a past time period of the current time period.

A self-detection result refers to a result obtained by the self-detection of the gas alarm. In some embodiments, the self-detection result may include that the gas alarm is normal and the gas alarm is abnormal. The processor of the gas alarm may determine the self-detection result in various ways and send the self-detection result to the smart gas safety management platform through the smart gas indoor equipment sensor network platform. In some embodiments, the processor of the gas alarm may compare the current gas concentration data detected in a preset time period with the historical gas concentration data detected in a historical time period corresponding to the preset time period. If a difference between the current gas concentration data detected in the preset time period and the historical gas concentration data detected in the historical time period corresponding to the preset time period is greater than a concentration threshold, then the self-detection result may be abnormal. The preset time period may be the current time period described above. The historical time period may be the past time period of the current time period. A concentration threshold refers to a minimum value of a concentration at which the self-detection result is abnormal. The concentration threshold may be preset by the staff.

In some embodiments, the gas alarm may determine the self-detection result through a gas concentration index. A gas concentration index refers to a quantitative value for determining an abnormal gas concentration. In some embodiments, the gas concentration index may be a weighted sum of a detection time and a total detection concentration. A weight value of the weighted sum may be determined based on historical experience. A detection time refers to a duration during which the gas concentration is detected during the preset time period. A total detection concentration refers to a sum of gas concentrations detected during the preset time period. In some embodiments, the gas concentration index may be determined based on an analysis of the current gas concentration data and the historical gas concentration data. In some embodiments, the gas alarm may compare the gas concentration index obtained based on the analysis of the current gas concentration data with the gas concentration index obtained based on the analysis of the historical gas concentration data. If a difference between the gas concentration index obtained based on the analysis of the current gas concentration data and the gas concentration index obtained based on the analysis of the historical gas concentration data is greater than a concentration index threshold, the self-detection result may be abnormal. A concentration index threshold refers to a minimum value of a concentration index for determining that the self-detection result is abnormal. The concentration index threshold may be preset by the staff.

In some embodiments the present disclosure, only monitoring the total concentration may overlook the fault of the equipment or a problem of gas supply. The gas concentration and the detection time may be considered at the same time, so that whether the gas is abnormal may be more accurately determined.

A first predetermined condition refers to a condition for determining a risk of fault. In some embodiments, the first predetermined condition may be that the self-detection result is abnormal. In some embodiments, the first predetermined condition may be preset by the staff.

In some embodiments, in response to determining that the self-detection result satisfies the first predetermined condition, the gas alarm may send the collaborative verification request and the gas monitoring data to the smart gas safety management platform through the smart gas indoor equipment sensor network platform. The smart gas safety management platform may receive the collaborative verification request and the gas monitoring data, and determine whether the gas alarm has the fault based on the gas monitoring data and the gas usage data of the user. Descriptions regarding determining whether the gas alarm has the fault may be found in FIG. 2 below or FIG. 3 and related descriptions thereof.

In some embodiments of the present disclosure, by considering the current gas concentration data and the historical gas concentration data of the gas alarm, the self-detection results of the gas alarm may be more accurately determined, which is conducive to discovering the risk existing in the gas alarm in time, thereby improving the reliability and accuracy of the gas alarm during usage.

In some embodiments, the smart gas safety management platform may determine the self-detection result through the gas alarm. The self-detection result may be determined based on the current gas concentration data and predicted gas concentration data of a current time point. The smart gas safety management platform may issue the collaborative verification request and the gas monitoring data through the gas alarm. The collaborative verification request and the gas monitoring data may be issued in response to determining that the self-detection result satisfies the first predetermined condition.

Predicted gas concentration data refers to gas concentration data of the current time point predicted in a historical time. In some embodiments, the predicted gas concentration data may be determined based on a fault detection model. More descriptions regarding the fault detection model may be found in FIG. 3 and related descriptions thereof.

In some embodiments, the gas alarm may compare the current gas concentration data detected in the preset time period with the predicted gas concentration data in the preset time period. If a difference between the current gas concentration data detected in the preset time period and the predicted gas concentration data in the preset time period is greater than a concentration threshold, the self-detection result may be abnormal. In some embodiments, the gas alarm may compare a gas concentration index obtained based on an analysis of the current gas concentration data with a gas concentration index calculated based on the predicted gas concentration data, and if a difference between the gas concentration index obtained based on the analysis of the current gas concentration data and the gas concentration index calculated based on the predicted gas concentration data is greater than a concentration index threshold, the self-detection result may be abnormal.

In some embodiments, when the difference between the current gas concentration data and the historical gas concentration data and the difference between the current gas concentration data and the predicted gas concentration data exist, the difference between the current gas concentration data and the predicted gas concentration data may be prioritized as a reference object, or a weighted sum of the difference between the current gas concentration data and the historical gas concentration data and the difference between the current gas concentration data and the predicted gas concentration data may be compared with a comprehensive concentration threshold. A weight value of the weighted sum may be determined based on historical experience. The comprehensive concentration threshold refers to a minimum value of a sum of a concentration and a concentration index for which the self-detection result is determined to be abnormal. The comprehensive concentration threshold may be preset by the staff.

In some embodiments, in response to determining that the self-detection result satisfies the first predetermined condition, the gas alarm may issue the collaborative verification request and the gas monitoring data to the smart gas safety management platform through the smart gas indoor equipment sensor network platform. The smart gas safety management platform may receive the collaborative verification request and the gas monitoring data, and determine whether the gas alarm has the fault based on the gas monitoring data and the gas usage data of the user. Descriptions regarding determining whether the gas alarm has the fault may be found in FIG. 2 or FIG. 3 and related descriptions thereof.

In some embodiments of the present disclosure, by considering the current gas concentration data of the gas alarm and the predicted gas concentration data of the current time point, the self-detection results of the gas alarm may be determined more accurately, which is conducive to discovering the risk existing in the gas alarm in time, thereby improving the reliability and accuracy of the gas alarm during usage.

A collaborative cycle refers to a cycle in which the smart gas safety management platform collaboratively determines whether the gas alarm has the fault. In some embodiments, the collaborative cycle may be preset by the staff.

In some embodiments the present disclosure, even if no collaborative verification request is received, the smart gas safety management platform may still determine whether the gas alarm has the fault through the collaborative cycle, which provides additional system reliability and stability, thereby guaranteeing the safety of gas usage and providing a better user experience.

In some embodiments, the smart gas safety management platform may update the collaborative cycle. More descriptions regarding updating the collaborative cycle may be found in FIG. 3 and related descriptions thereof.

In some embodiments, the smart gas safety management platform may obtain a plurality of gas data clusters in advance based on a plurality of historical gas monitoring data and a plurality of historical gas usage data of a plurality of historical users through clustering and analysis. Each gas data cluster may correspond to at least one attribute. The attribute may include a fault attribute, a fault type attribute, or the like. The historical gas usage data refers to gas usage data of a past time period. More descriptions regarding the historical gas monitoring data and the gas usage data may be found in FIG. 2 and related descriptions thereof. In response to determining that the collaborative verification request is received or the collaborative cycle is satisfied, the smart gas safety management platform may calculate a first distance from the current gas monitoring data and the gas usage data of the user to each gas data cluster. In some embodiments, the first distance refers to a distance from the current gas monitoring data and the gas usage data of the user to a cluster center of each gas data cluster. In some embodiments, the first distance refers to a distance from the current gas monitoring data and the gas usage data of the user to each gas data cluster. In some embodiments, the first distance may be a Euclidean distance, etc. The smart gas safety management platform may determine the fault attribute corresponding to the gas data cluster with a smallest first distance as whether the current gas alarm has the fault.

In some embodiments, the smart gas safety management platform may determine whether the gas alarm has the fault based on the fault detection model. More descriptions regarding the fault detection model may be found in FIG. 3 and related descriptions thereof.

Operation 230, in response to determining that the gas alarm has the fault, generating, based on the gas monitoring data, a fault data sequence of the gas alarm.

A fault data sequence refers to a sequence consisting of data related to the gas alarm having the fault. In some embodiments, the fault data sequence may include a fault type of the gas alarm, a confidence level of the fault type, etc. A fault confidence level refers to a level of confidence that the gas alarm has the fault type. More descriptions regarding the fault type may be found in FIG. 2 and related descriptions thereof.

In some embodiments, in response to determining that the collaborative verification request is received or the collaborative cycle is satisfied, the smart gas safety management platform may calculate a second distance from the current gas monitoring data and each gas data cluster. In some embodiments, the second distance may be calculated by the Euclidean distance. The smart gas safety management platform may determine the fault type and the fault confidence level based on fault type data and the second distance corresponding to each gas data cluster. For example, the smart gas safety management platform may determine at least one fault type of which the second distance is less than a distance threshold as the fault type in the fault data sequence, construct a first predetermined table by pre-recording and storing correspondences between different second distances and different fault confidence levels, and determine, based on the second distance, the fault confidence level of the at least one fault type by looking up the table, or the like, thereby determining the fault data sequence.

In some embodiments, the fault data sequence may be determined based on a fault parameter determination model. More descriptions regarding the fault parameter determination model may be found in FIG. 4 and related descriptions thereof.

Operation 240, determining, based on the fault data sequence, a dispatching maintenance parameter of the gas alarm.

A dispatching maintenance parameter refers to a relevant parameter for maintenance of the gas alarm. In some embodiments, the dispatching maintenance parameter may include a parameter related to a dispatched staff corresponding to the maintenance of the gas alarm, a dispatching time corresponding to the maintenance, a maintenance tool corresponding to the maintenance, etc.

Different dispatched staff may correspond to a variety of different information. For example, the information of the dispatched staff may include a number, maintenance experience, a fault type that the dispatched staff specializes in maintenance, etc. The dispatching time may be a time difference between a start time of the maintenance and a current time. The maintenance tool may include a gas pipeline, a screwdriver, a new gas alarm, etc.

In some embodiments, the smart gas safety management platform may construct a second predetermined table by pre-recording and storing correspondences between different fault types and different dispatching maintenance parameters. The smart gas safety management platform may determine the dispatching maintenance parameter by querying the second predetermined table based on a fault type corresponding to a fault confidence level greater than a fault confidence level threshold in the fault data sequence.

In some embodiments, the smart gas safety management platform may determine the dispatching maintenance parameter based on the fault data sequence output by the fault parameter determination model. More descriptions regarding the fault parameter determination model may be found in FIG. 4 and related descriptions thereof.

In some embodiments of the present disclosure, the gas alarm may carry out the self-detection based on the self-detection cycle and periodically transmit the gas monitoring data based on the transmission cycle, which is conducive to discovering potential faults of the gas alarm in time, thereby providing the comprehensive gas monitoring data. In response to determining that the collaborative verification request is received or the collaborative cycle is satisfied, the smart gas safety management platform may determine whether the gas alarm has the fault based on the gas monitoring data and the gas usage data of the user, and determine the fault data sequence and the dispatching maintenance parameter, so that the factors affecting the performance of the gas alarm may be comprehensively considered, the potential problems may be discovered in time and the gas alarm may be maintained in time, thereby improving the performance and reliability of the gas alarm, guaranteeing the safety of gas usage, and improving the user experience.

It should be noted that the foregoing descriptions of the process are for the purpose of exemplary illustration only and do not limit the scope of application of the present disclosure. For those skilled in the art, various corrections and changes may be made to the process under the guidance of the present disclosure. However, such corrections and changes remain within the scope of the present disclosure.

Figure 3:
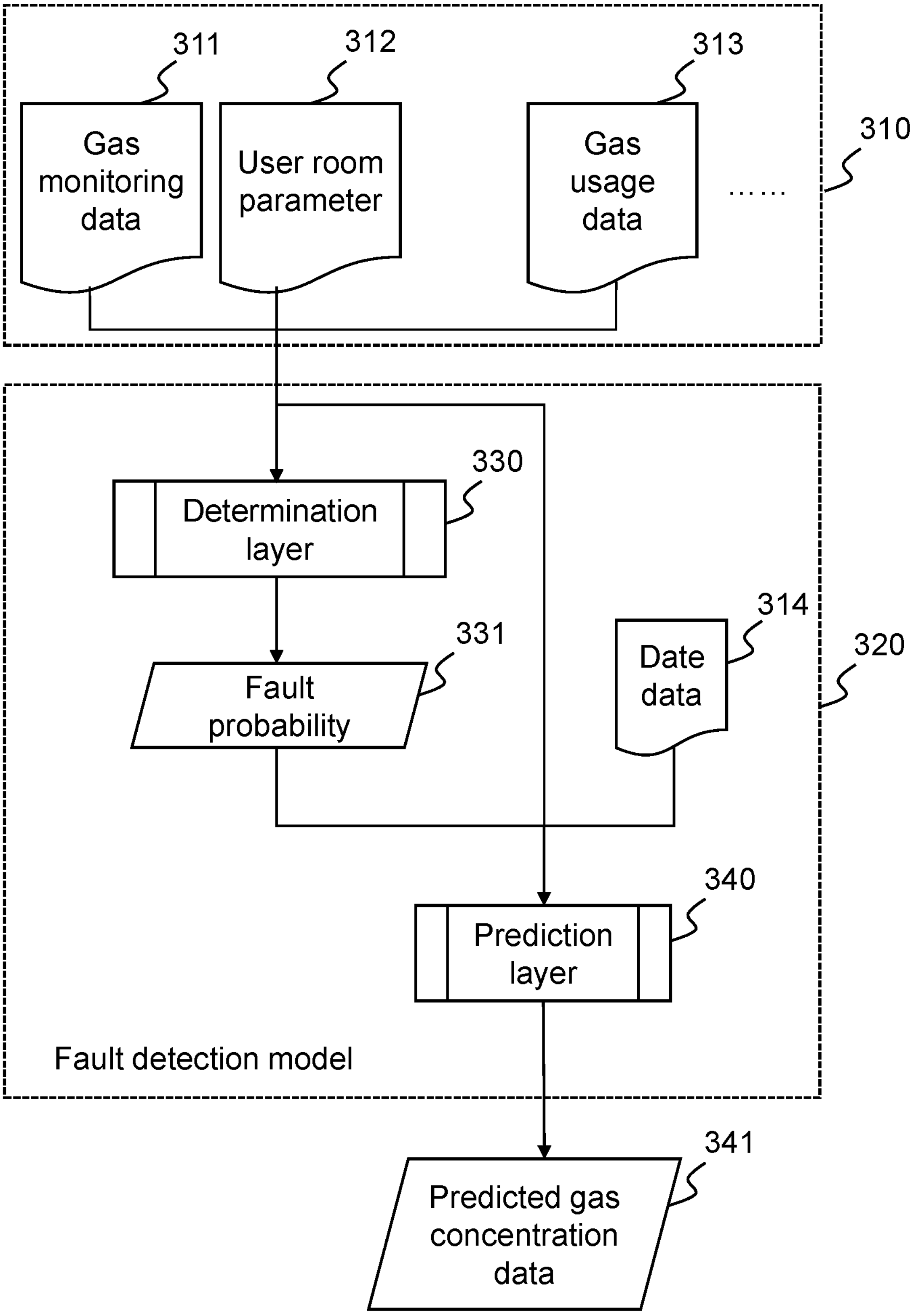
FIG. 3 is a schematic diagram illustrating an exemplary fault detection model according to some embodiments of the present disclosure.

FIG. 3 is schematic diagram illustrating an exemplary fault detection model according to some embodiments of the present disclosure.

In some embodiments, a smart gas safety management platform may determine, based on gas monitoring data 311, gas usage data 313, and a user room parameter 312, a fault probability 331 of a gas alarm through a fault detection model 320. The smart gas safety management platform may determine whether the gas alarm has a fault based on the fault probability 331.

The gas monitoring data 311 may include at least one of gas concentration data, ambient temperature data, and ambient humidity data. The gas monitoring data 311 may include data at a plurality of time points, such as current gas monitoring data and historical gas monitoring data. More descriptions regarding the gas monitoring data and the gas usage data, may be found in FIG. 2 and related descriptions thereof.

A user room parameter 312 refers to a parameter related to a room of gas usage. For example, the user room parameter 312 may include data such as a size of the room. In some embodiments, an installer may measure the user room parameter 312 when the gas alarm is installed. In some embodiments, the installer may upload the user room parameter 312 through the smart gas user platform, transmit the user room parameter 312 through the smart gas service platform and store the user room parameter 312 in a smart gas data center of the smart gas safety management platform.

A fault probability 331 refers to a probability that the gas alarm has the fault.

In some embodiments, the fault detection model 320 may be a machine learning model of a structure customized below. The fault detection model 320 may also be a machine learning model of another structure, such as a Neural Networks (NN) model, etc.

In some embodiments, an input 310 of the fault detection model 320 may include the gas monitoring data 311, the gas usage data 313, the user room parameter 312, etc., and an output of the fault detection model 320 may include the fault probability 331.

In some embodiments, the fault detection model may be trained based on first training samples with first labels. A plurality of first training samples with the first labels may be input into an initial fault detection model. A loss function may be constructed based on the first labels and results of the initial fault detection model. Parameters of the initial fault detection model may be iteratively updated based on the loss function. The model training may be completed when the loss function of the initial fault detection model satisfies a predetermined condition, and a trained fault detection model may be obtained. The predetermined condition may be that the loss function converges, a count of iterations reaches a threshold, etc. In some embodiments, each set of training samples of the first training sample may include sample monitoring data, sample gas usage data, and sample user room parameters, and the first labels of each set of training samples may be whether sample gas alarms actually have the fault. For example, a first label of 0 indicates that the gas alarm has no fault, and a first label of 1 indicates that the gas alarm has the fault. In some embodiments, the first training samples and the first labels may be obtained based on historical data.

In some embodiments, in response to determining that the fault probability is greater than a fault threshold, the smart gas safety management platform may determine that the gas alarm has the fault; and in response to determining that the fault probability is less than or equal to the fault threshold, the smart gas safety management platform may determine that the gas alarm has no fault.

In some embodiments the present disclosure, the smart gas safety management platform may process the gas monitoring data and the gas usage data through the fault detection model, which may find patterns from a large amount of gas monitoring data and gas usage data using the self-learning capability of the machine learning model, and obtain the correlation between the fault probability and the gas monitoring data and the gas usage data, thereby improving the accuracy and efficiency of determining the fault probability, and avoiding losses due to the fault of the gas alarm.

In some embodiments, the fault detection model 320 may include a determination layer 330 and a prediction layer 340. In some embodiments, the determination layer 330 and the prediction layer 340 may be Deep Neural Networks (DNN).

In some embodiments, the smart gas safety management platform may determine, based on the gas monitoring data 311, the gas usage data 313, and the user room parameter 312, the fault probability through the determination layer 330; and in response to determining that the gas alarm has no fault, determine, based on the fault probability 331, the gas monitoring data 311, the gas usage data 313, the user room parameter 312, and date data 314, predicted gas concentration data 341 of a future time point of the gas alarm through the prediction layer 340.

In some embodiments, an input of the determination layer 330 may include the gas monitoring data 311, the gas usage data 313, the user room parameter 312, etc., and an output of the determination layer 330 may include the fault probability 331.

In some embodiments, the determination layer may be trained based on second training samples with second labels. In some embodiments, each set of training samples of the second training samples may include sample gas monitoring data, sample gas usage data, and sample user room parameters, and the second labels of each set of training samples of the second training samples may be whether sample gas alarms have the fault. For example, a first label of 0 indicates that the gas alarm has no fault, and a first label of 1 indicates that the gas alarm has the fault. In some embodiments, the second training samples and the second labels may be obtained based on the historical data. A training process of the determination layer may be similar to a training process of the fault detection model, which may be found in the related descriptions of FIG. 3.

In some embodiments, in response to determining that the fault probability satisfies a second predetermined condition, the smart gas safety management platform may update, based on the fault probability, the collaborative cycle. More descriptions regarding the collaborative cycle may be found in FIG. 2 and related descriptions thereof.

A second predetermined condition refers to a condition for determining whether the collaborative cycle is updated. In some embodiments, the second predetermined condition may be that the fault probability 331 is greater than a suspicion threshold and less than a fault threshold. A suspicion threshold refers to a minimum value of the fault probability that requires updating of the collaborative cycle and may be determined based on historical experience. In some embodiments, the second predetermined condition may be preset based on the historical experience.

In some embodiments, an initial collaborative cycle may be preset, and a duration of an updated collaborative cycle may be negatively correlated to the fault probability 331. For example, when the fault probability of the gas alarm is greater than the suspicion threshold but less than the fault threshold, the collaborative cycle may be shortened, and the greater the fault probability, the more the duration of the corresponding collaborative cycle is shortened and the shorter the updated collaborative cycle.

In some embodiments of the present disclosure, the collaborative cycle may be updated based on the fault probability of the gas alarm, so that the accuracy of the determined collaborative cycle may be improved, which is more conducive to the monitoring of the gas alarm, thereby improving the reliability of the gas alarm during usage, and reducing the possibility of accidents.

In some embodiments, an input of the prediction layer 340 may include the fault probability 331, the gas monitoring data 311, the gas usage data 313, the user room parameters 312, the date data 314, etc. An output of the prediction layer 340 may include the predicted gas concentration data 341 of the future time point.

In some embodiments, a degree to which the prediction layer 340 uses the current gas concentration data from the gas monitoring data in the prediction may be positively correlated to a trust level. More descriptions regarding the current gas concentration data may be found in FIG. 2 and related descriptions thereof. A trust level refers to a degree of trust that the prediction layer has in the current gas concentration data. In some embodiments, the trust level may be negatively correlated to the fault probability. For example, 15 historical gas concentration data and 5 current gas concentration data are provided, and if the determination layer determines that the fault probability is low, that is, the trust level in the current gas concentration data is high, the prediction layer may predict the predicted gas concentration data of the future time point using the 10 historical gas concentration data and the 5 current gas concentration data. If the fault probability is high, but not greater than the suspicion threshold, the prediction layer may predict the predicted gas concentration data of the future time point using 13 historical gas concentration data and 2 randomly selected current gas concentration data.

Date data 314 refers to data related to a current time. For example, the date data 314 may include seasonal data of a season to which the current time belongs, a specific date to which the current time belongs, etc. In some embodiments, the smart gas safety management platform may obtain the date data 314 on a network through the smart gas indoor equipment sensor network platform. Different seasons and dates may correspond to different gas consumptions, and thus the predicted gas concentration data may also be different.

The predicted gas concentration data of the future time point refers to predicted gas concentration data corresponding to the future time point. The predicted gas concentration data may include gas concentration data of a plurality of future time points. More descriptions regarding the predicted gas concentration data may be found in FIG. 2 and related descriptions thereof.

In some embodiments, the prediction layer may be trained based on third training samples with third labels. In some embodiments, each set of training samples of the third training sample may include sample fault probabilities, sample gas monitoring data, sample gas usage data, sample user room parameters, and sample date data corresponding to a historical first time period. The third labels of each set of training samples may include sample actual gas concentration data corresponding to a historical third time period. The historical first time period may precede the historical third time period. In some embodiments, the third training samples may be obtained based on the historical data, and the third labels may be obtained based on actual gas concentration data of the historical third time period through labeling. A training process of the prediction layer may be similar to a training process of the fault detection model, which may be found in the related descriptions of FIG. 3.

In some embodiments, the smart gas safety management platform may transmit the predicted gas concentration data 341 predicted by the prediction layer to the gas alarm of the smart gas indoor equipment object platform through the smart gas indoor equipment sensor network platform, so that the gas alarm may determine the self-detection result based on the current gas concentration data and the predicted gas concentration data of the current time point, thereby determining whether the collaborative verification request and the gas monitoring data are issued. More descriptions may be found in FIG. 2 and related descriptions thereof.

In some embodiments the present disclosure, the smart gas safety management platform may process the gas monitoring data and the gas usage data by dividing the fault detection model into the determination layer and the prediction layer, which may find patterns from a large amount of gas monitoring data and gas usage data using the self-learning capability of the machine learning model, and consider the factors affecting the performance of the gas alarm, thereby improving the accuracy and efficiency of determining the fault probability and predicting the gas concentration data, and discovering the potential problems in time and taking corresponding preventive and corrective measures.

In some embodiments, the smart gas safety management platform may predict predicted gas concentration data 341 of the future time point through the prediction layer 340 based on a predetermined prediction cycle. The fault probability 331 in the input of the prediction layer 340 may be the fault probability 331 most recently output by the determination layer output from the current time point.

A predetermined prediction cycle refers to a cycle in which the prediction layer periodically makes a prediction. In some embodiments, the predetermined prediction period may be preset by the staff.

In some embodiments of the present disclosure, the smart gas safety management platform may not only predict the predicted gas concentration data of the future time point when the collaborative calibration request is received, but also periodically (based on the predetermined prediction cycle) predict the predicted gas concentration data of the future time point, and send the predicted gas concentration data of the future time point to the gas alarm for the self-detection, thereby improving the reliability of the gas alarm, and guaranteeing the safety of gas usage.

Figure 4:
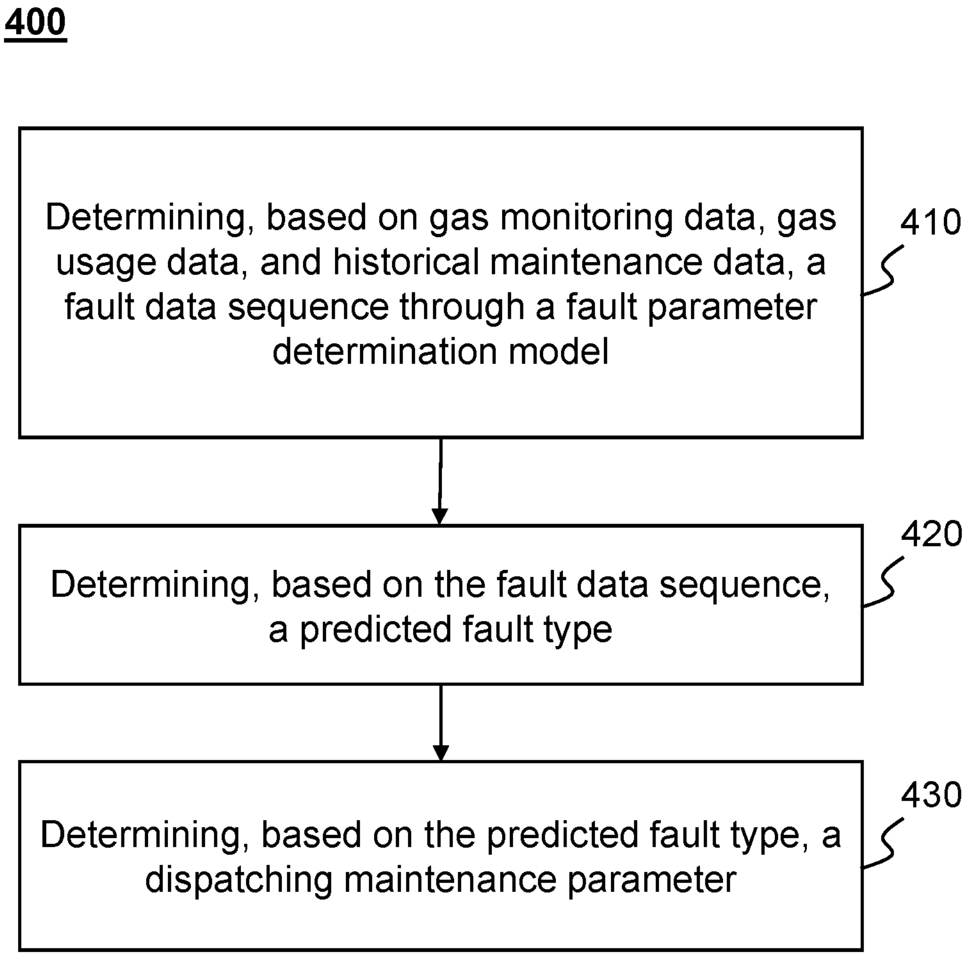
FIG. 4 is a flowchart illustrating an exemplary process for determining a dispatching maintenance parameter according to some embodiments of the present disclosure.

FIG. 4 is a flowchart illustrating an exemplary process for determining a dispatching maintenance parameter according to some embodiments the present disclosure. As illustrated in FIG. 4, a process 400 may include the following operations. In some embodiments, the process 400 may be performed by a smart gas safety management platform.

Operation 410, determining, based on gas monitoring data, gas usage data, and historical maintenance data, a fault data sequence through a fault parameter determination model.

In some embodiments, the fault parameter determination model may be a machine learning model, such as a deep neural networks (DNN) model, a convolutional neural networks (CNN) model, or the like, or any combination thereof.

In some embodiments, an input of the fault parameter determination model may include the gas monitoring data, the gas usage data, and the historical maintenance data, and an output of the fault parameter determination model may include the fault data sequence.

More descriptions regarding the gas monitoring data, the gas usage data, and the fault data sequence may be found in FIG. 2 and related descriptions thereof.

Historical maintenance data refers to data about the gas alarm related to inspection and maintenance. For example, the historical maintenance data may include a count of historical inspections and maintenances of the gas alarm, a time of historical inspections and maintenances of the gas alarm, specific inspections and maintenances, or the like. In some embodiments, the smart gas safety management platform may obtain the historical maintenance data of the storage equipment in the gas alarm of the smart gas indoor equipment object platform through the smart gas indoor equipment sensing network platform.

In some embodiments, the fault parameter determination model may be trained based on fourth training samples with fourth labels. In some embodiments, each set of training samples of the fourth training samples may include sample gas monitoring data, sample gas usage data, and sample historical maintenance data. The fourth labels corresponding to each set of training samples of the fourth training samples may include at least one corresponding actual fault type. The fault type that is actually present may correspond to a value of 1, and the fault type that is not actually present may correspond to a value of 0. In some embodiments, the fourth training samples and the fourth labels may be obtained based on historical data. A training process for the fault parameter determination model may be similar to a training process of the fault detection model, which may be found in FIG. 3 and related descriptions thereof.

Operation 420, determining, based on the fault data sequence, a predicted fault type.

The fault data sequence may include a fault type of the gas alarm and a fault confidence level of the fault type. More descriptions regarding the fault data sequence may be found in FIG. 2 and related descriptions thereof.

A predicted fault type refers to a predicted fault type of the gas alarm.

In some embodiments, the smart gas safety management platform may determine a fault type corresponding to a fault confidence level greater than a fault confidence level threshold as the predicted fault type.

Operation 430, determining, based on the predicted fault type, a dispatching maintenance parameter.

In some embodiments, the smart gas safety management platform may determine the dispatching repair parameter (e.g., a dispatching time, a dispatched staff, etc.) by looking up a table, etc., based on the predicted fault type and a second predetermined table. More descriptions regarding the second predetermined table and the dispatching maintenance parameter may be found in FIG. 2 and related descriptions thereof.

In some embodiments, the smart gas safety management platform may search in a dispatched staff database based on the predicted fault type to select a dispatched staff that specializes in the predicted fault type as the dispatched staff in the dispatching maintenance parameter. The dispatched staff database may store information related to different dispatched staff. More descriptions regarding the information related to the dispatched staff may be found in FIG. 2 and related descriptions thereof. The smart gas safety management platform may remind, based on the predicted fault type, the dispatched staff of a maintenance tool that needs to be carried through a control instruction, etc., or a new gas alarm that needs to be carried for replacement when the gas alarm is determined not to be maintained.

In some embodiments, the dispatching maintenance parameter may also be related to a user usage feature. More descriptions regarding the user usage feature may be found in FIG. 2 and related descriptions thereof. For example, the user usage feature indicates that the more frequent the gas usage of the user, and the greater the gas consumption of the user, the shorter the corresponding dispatching time in the dispatching maintenance parameter.

In some embodiments of the present disclosure, the smart gas safety management platform may determine the fault data sequence based on the fault parameter determination model, and then determine the predicted fault type and the dispatching maintenance parameter, so that the fault data sequence may be more accurately determined by analyzing and learning a large amount of historical data, thereby improving the accuracy of the determined predicted fault type and the dispatching maintenance parameter, dispatching the maintenance of the gas alarm in time, and improving the reliability of the gas alarm.

One or more embodiments of the present disclosure provide a non-transitory computer-readable storage medium storing computer instructions that, when read by a computer, may direct the computer to implement the method for detecting the gas alarm based on smart gas.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers “about”, “approximately” or “substantially” in some examples. Unless otherwise stated, “about”, “approximately” or “substantially” indicates that the stated figure allows for a variation of +20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for detecting a gas alarm based on smart gas, comprising:

determining a self-detection parameter and collecting gas monitoring data through the gas alarm, the self-detection parameter including a self-detection cycle and a transmission cycle, and the gas monitoring data including at least one of gas concentration data, ambient temperature data, and ambient humidity data;

in response to determining that a collaborative verification request is received or a collaborative cycle is satisfied, determining whether the gas alarm has a fault based on the gas monitoring data and gas usage data of a user;

in response to determining that the gas alarm has the fault, generating, based on the gas monitoring data, a fault data sequence of the gas alarm; and determining, based on the fault data sequence, a dispatching maintenance parameter of the gas alarm.

2. The method of claim 1, wherein the determining a self-detection parameter includes:

generating, based on a service life of the gas alarm, seasonal data of the gas alarm, and the gas usage data, a detection feature vector; and determining, based on the detection feature vector, the self-detection parameter through a vector database.

3. The method of claim 2, wherein the detection feature vector is related to gas concentration fluctuation data.

4. The method of claim 2, further comprising:

determining a self-detection result through the gas alarm, the self-detection result being determined based on current gas concentration data and historical gas concentration data; and issuing the collaborative verification request and the gas monitoring data through the gas alarm, the collaborative verification request and the gas monitoring data being issued in response to determining that the self-detection result satisfies a first predetermined condition.

5. The method of claim 2, further comprising:

determining a self-detection result through the gas alarm, the self-detection result being determined based on current gas concentration data and predicted gas concentration data of a current time point; and issuing the collaborative verification request and the gas monitoring data through the gas alarm, the collaborative verification request and the gas monitoring data being issued in response to determining that the self-detection result satisfies a first predetermined condition.

6. The method of claim 1, wherein the determining whether the gas alarm has a fault based on the gas monitoring data and gas usage data of a user includes:

determining, based on the gas monitoring data, the gas usage data, and a user room parameter, a fault probability of the gas alarm through a fault detection model, the fault detection model being a machine learning model; and determining whether the gas alarm has the fault based on the fault probability.

7. The method of claim 6, wherein the fault detection model includes a determination layer and a prediction layer, and the method further comprises:

determining, based on the gas monitoring data, the gas usage data, and the user room parameter, the fault probability through the determination layer; and in response to determining that the gas alarm has no fault, determining, based on the fault probability, the gas monitoring data, the gas usage data, the user room parameter, and date data, predicted gas concentration data of a future time point of the gas alarm through the prediction layer.

8. The method of claim 7, further comprising:

in response to determining that the fault probability satisfies a second predetermined condition, updating, based on the fault probability, the collaborative cycle.

9. The method of claim 6, further comprising:

determining, based on the gas monitoring data, the gas usage data, and historical maintenance data, a fault data sequence through a fault parameter determination model, the fault parameter determination model being a machine learning model;

determining, based on the fault data sequence, a predicted fault type, the fault data sequence including a fault type of the gas alarm and a fault confidence level of the fault type; and determining, based on the predicted fault type, the dispatching maintenance parameter, the dispatching maintenance parameter including a dispatched staff and a dispatching time.

10. An Internet of things (IoT) system for detecting a gas alarm based on smart gas, wherein the system comprises a smart gas user platform, a smart gas service platform, a smart gas safety management platform, a smart gas indoor equipment sensor network platform, and a smart gas indoor equipment object platform which interact in sequence; wherein the smart gas safety management platform includes a smart gas indoor safety management sub-platform and a smart gas data center;

the smart gas indoor equipment sensor network platform is configured to interact with the smart gas data center and the smart gas indoor equipment object platform; and the smart gas safety management platform is configured to:

determine a self-detection parameter and collect gas monitoring data through the gas alarm, the self-detection parameter including a self-detection cycle and a transmission cycle, and the gas monitoring data including at least one of gas concentration data, ambient temperature data, and ambient humidity data;

in response to determining that a collaborative verification request is received or a collaborative cycle is satisfied, determine whether the gas alarm has a fault based on the gas monitoring data and gas usage data of a user;

in response to determining that the gas alarm has the fault, generate, based on the gas monitoring data, a fault data sequence of the gas alarm; and determine, based on the fault data sequence, a dispatching maintenance parameter of the gas alarm; wherein the smart gas service platform is configured to send the dispatching maintenance parameter to the smart gas user platform.

11. The system of claim 10, wherein the smart gas safety management platform is further configured to:

generate, based on a service life of the gas alarm, seasonal data of the gas alarm, and the gas usage data, a detection feature vector; and determine, based on the detection feature vector, the self-detection parameter through a vector database.

12. The system of claim 11, wherein the detection feature vector is related to gas concentration fluctuation data.

13. The system of claim 11, wherein the smart gas safety management platform is further configured to:

determine a self-detection result through the gas alarm, the self-detection result being determined based on current gas concentration data and historical gas concentration data; and issue the collaborative verification request and the gas monitoring data through the gas alarm, the collaborative verification request and the gas monitoring data being issued in response to determining that the self-detection result satisfies a first predetermined condition.

14. The system of claim 11, wherein the smart gas safety management platform is further configured to:

determine a self-detection result through the gas alarm, the self-detection result being determined based on current gas concentration data and predicted gas concentration data of a current time point; and issue the collaborative verification request and the gas monitoring data through the gas alarm, the collaborative verification request and the gas monitoring data being issued in response to determining that the self-detection result satisfies a first predetermined condition.

15. The system of claim 10, wherein the smart gas safety management platform is further configured to:

determine, based on the gas monitoring data, the gas usage data, and a user room parameter, a fault probability of the gas alarm through a fault detection model, the fault detection model being a machine learning model; and determine whether the gas alarm has the fault based on the fault probability.

16. The system of claim 15, wherein the fault detection model includes a determination layer and a prediction layer, and the smart gas safety management platform is further configured to:

determine, based on the gas monitoring data, the gas usage data, and the user room parameter, the fault probability through the determination layer; and in response to determining that the gas alarm has no fault, determine, based on the fault probability, the gas monitoring data, the gas usage data, the user room parameter, and date data, predicted gas concentration data of a future time point of the gas alarm through the prediction layer.

17. The system of claim 16, wherein the smart gas safety management platform is further configured to:

in response to determining that the fault probability satisfies a second predetermined condition, update, based on the fault probability, the collaborative cycle.

18. The system of claim 15, wherein the smart gas safety management platform is further configured to:

determine, based on the gas monitoring data, the gas usage data and historical maintenance data, a fault data sequence through a fault parameter determination model, the fault parameter determination model being a machine learning model;

determine, based on the fault data sequence, a predicted fault type, the fault data sequence including a fault type of the gas alarm and a fault confidence level of the fault type; and determine, based on the predicted fault type, the dispatching maintenance parameter, the dispatching maintenance parameter including a dispatched staff and a dispatching time.

19. A non-transitory computer-readable storage medium storing computer instructions that, when read by a computer, direct the computer to implement the method of claim 1.

* * * * *